(12) United States Patent
Hart et al.

(10) Patent No.: US 10,152,530 B1
(45) Date of Patent: Dec. 11, 2018

(54) DETERMINING A RECOMMENDED CONTROL POINT FOR A FILE SYSTEM

(71) Applicant: Symantec Corporation, Mountain View, CA (US)

(72) Inventors: Michael Andrew Hart, Brooklyn, NY (US); Anantharaman Ganesh, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 466 days.

(21) Appl. No.: 14/339,118

(22) Filed: Jul. 23, 2014

Related U.S. Application Data

(60) Provisional application No. 61/858,062, filed on Jul. 24, 2013.

(51) Int. Cl.
  *G06F 17/30* (2006.01)
  *H04L 29/06* (2006.01)

(52) U.S. Cl.
  CPC ........ *G06F 17/30595* (2013.01); *H04L 63/10* (2013.01)

(58) Field of Classification Search
  CPC ........... G06F 21/6218; G06F 17/30126; G06F 17/30165; G06F 17/30067; G06F 17/30174; G06F 21/10; G06F 21/62; G06F 2221/2141; G06F 17/3007; G06F 17/30115
  See application file for complete search history.

(56) References Cited

U.S. PATENT DOCUMENTS

| | | | |
|---|---|---|---|
| 5,764,890 A | 6/1998 | Glasser et al. |
| 5,784,463 A | 7/1998 | Chen et al. |
| 5,950,203 A | 9/1999 | Stakuis et al. |
| 6,029,160 A | 2/2000 | Cabrera et al. |
| 6,073,209 A | 6/2000 | Bergsten |
| 6,088,451 A | 7/2000 | He et al. |
| 6,216,202 B1 | 4/2001 | D'Errico |
| 6,263,446 B1 | 7/2001 | Kausik et al. |
| 6,275,892 B1 | 8/2001 | Arnott |
| 6,314,425 B1 | 11/2001 | Serbinis et al. |
| 6,324,537 B1 | 11/2001 | Moran |
| 6,374,402 B1 | 4/2002 | Schmeidler et al. |
| 6,385,729 B1 | 5/2002 | DiGiorgio et al. |

(Continued)

OTHER PUBLICATIONS

Nowicki, Bill, "NFS: Network File System Protocol Specification", Sun Microsystems, Inc., Mar. 1989, pp. 1-27.

(Continued)

*Primary Examiner* — Angelica Ruiz
(74) *Attorney, Agent, or Firm* — Meyertons Hood Kivlin Kowert and Goetzel PC; Rory D. Rankin

(57) ABSTRACT

A control point module may receive information associated with a plurality of users accessing a plurality of files. Each of the files may be stored in a folder of the plurality of folders. Users who have accessed one or more files stored in a folder may be assigned to each corresponding folder. Users who have been assigned to each folder of a plurality of pairs of the folders may be compared to identify one or more differences of assigned users between each folder of each pair of the folders. Furthermore, a recommended control point may be determined based on the identified one or more differences of the assigned users.

17 Claims, 8 Drawing Sheets

(56) References Cited

U.S. PATENT DOCUMENTS

| | | |
|---|---|---|
| 6,453,362 B1 | 9/2002 | Bittinger et al. |
| 6,466,982 B1 | 10/2002 | Ruberg |
| 6,564,215 B1 | 5/2003 | Hsiao et al. |
| 6,574,705 B1 | 6/2003 | Peloquin et al. |
| 6,587,867 B1 | 7/2003 | Miller et al. |
| 6,594,698 B1 | 7/2003 | Chow et al. |
| 6,606,651 B1 | 8/2003 | Linde |
| 6,606,690 B2 | 8/2003 | Padovano |
| 6,615,264 B1 | 9/2003 | Stoltz et al. |
| 6,675,268 B1 | 1/2004 | DeKoning et al. |
| 6,718,372 B1 | 4/2004 | Bober |
| 6,745,207 B2 | 6/2004 | Reuter et al. |
| 6,763,423 B2 | 7/2004 | Stakutis et al. |
| 6,834,324 B1 | 12/2004 | Wood |
| 6,856,800 B1 | 2/2005 | Henry et al. |
| 6,886,035 B2 | 4/2005 | Wolff |
| 6,944,732 B2 | 9/2005 | Thunquest et al. |
| 6,965,993 B2 | 11/2005 | Baker |
| 6,983,295 B1 | 1/2006 | Hart |
| 6,985,914 B2 | 1/2006 | Venkatesh et al. |
| 7,020,758 B2 | 3/2006 | Fisk |
| 7,028,090 B2 | 4/2006 | McBrearty et al. |
| 7,035,854 B2 | 4/2006 | Hsiao et al. |
| 7,111,324 B2 | 9/2006 | Elteto et al. |
| 7,134,138 B2 | 11/2006 | Scherr |
| 7,191,225 B1 | 3/2007 | Borthakur |
| 7,191,344 B2 | 3/2007 | Lin et al. |
| 7,191,467 B1 | 3/2007 | Dujari et al. |
| 7,231,526 B2 | 6/2007 | Hon et al. |
| 7,275,259 B2 | 9/2007 | Jamieson et al. |
| 7,328,287 B1 | 2/2008 | Arumugham et al. |
| 7,720,864 B1 | 5/2010 | Muth et al. |
| 7,814,554 B1* | 10/2010 | Ragner .................. G06F 21/52 713/165 |
| 8,042,163 B1 | 10/2011 | Karr et al. |
| 2003/0084171 A1 | 5/2003 | De Jong et al. |
| 2003/0084292 A1 | 5/2003 | Pierce et al. |
| 2003/0163725 A1 | 8/2003 | Feuser et al. |
| 2003/0172265 A1 | 9/2003 | Vu et al. |
| 2003/0177370 A1 | 9/2003 | Smith |
| 2003/0187883 A1 | 10/2003 | Zelenka et al. |
| 2003/0187993 A1 | 10/2003 | Ribot |
| 2003/0200202 A1 | 10/2003 | Hsiao et al. |
| 2003/0204743 A1 | 10/2003 | Devadas et al. |
| 2004/0015585 A1 | 1/2004 | McBrearty et al. |
| 2004/0064729 A1 | 4/2004 | Yellepeddy |
| 2004/0103325 A1 | 5/2004 | Priebatsch |
| 2004/0153451 A1 | 8/2004 | Phillips et al. |
| 2004/0255143 A1 | 12/2004 | Wemyss et al. |
| 2006/0080397 A1* | 4/2006 | Chene .................... H04L 67/00 709/213 |
| 2009/0249290 A1* | 10/2009 | Jenkins ............. G06F 17/30011 717/109 |
| 2009/0271455 A1* | 10/2009 | Nagarajan ......... G06F 17/30079 |
| 2010/0082497 A1* | 4/2010 | Biesemann ............ G06Q 10/06 705/301 |
| 2010/0232653 A1* | 9/2010 | Muquit .................... G06F 21/32 382/116 |
| 2011/0173679 A1* | 7/2011 | Perumal .............. G06F 21/6218 726/4 |
| 2011/0225199 A1* | 9/2011 | Marathe .............. G06F 17/3007 707/781 |
| 2011/0296523 A1* | 12/2011 | Schechter ........... G06F 21/6218 726/21 |
| 2012/0011161 A1* | 1/2012 | Marathe ................ G06F 21/604 707/785 |
| 2012/0203705 A1* | 8/2012 | Van Beneden ........ G06Q 10/10 705/317 |
| 2012/0304247 A1* | 11/2012 | Badger ............... G06F 21/6218 726/1 |
| 2013/0179381 A1* | 7/2013 | Kawabata ......... G06F 17/30144 706/46 |

OTHER PUBLICATIONS

"IBM Tivoli SANergy Administratior's Guide", International Business Machines Corporation, Oct. 2002, pp. i-106, 4th edition.

Gibson et al., "File Server Scaling with Network-Attached Secure Disks", Proceedings of the ACM International Conference on Measurement and Modeling of Computer Systems, Jun. 15-18, 1997, 13 pages.

Gibson et al., "Filesystems for Network-Attached Secure Disks", CMU-CS-97-118, Jul. 1997, 18 pages.

Gibson et al., "A Cost-Effective, High Bandwidth Storage Architecture", Proceedings of the 8th Conference on Architectual Support for Programming Languages and Operating Systems, Oct. 1, 1998, 12 pages.

Czerininski et al., "An Architecture for a Secure Service Discovery Service", MobiCom '99 Proceedings of the 5th Annual ACM/IEEE International Conference on Mobile Computing and Networking, Aug. 1, 1999, pp. 24-35.

Sandhu et al., "Access Control: Principles and Practice", IEEE Communications Magazine, Sep. 1994, 21 pages, vol. 32, Issue 9.

Bhattacharya et al., "Coordinating Backup/Recovery and Data Consistency Between Database and File Systems", Proceedings of the 2002 ACM SIGMOD International Conference on Management of Data, Jun. 3-6, 2002, pp. 500-511.

Ban, Bela, "Overview of HSQLDB Replication (HSQLDB/R)", Aug./Sep. 2002, 10 pages.

Clark, Elizabeth, "Fibre Channel SAN Security", Sep. 4, 2002, 5 pages, http://www.networkmagazine.com/shared/article/showArticle. jthml?articleId=8703406. [Retrieved on May 17, 2005].

King, Bill, "LUN Masking in a SAN", QLogic Communications, Inc., Oct. 8, 2001, 12 pages.

* cited by examiner

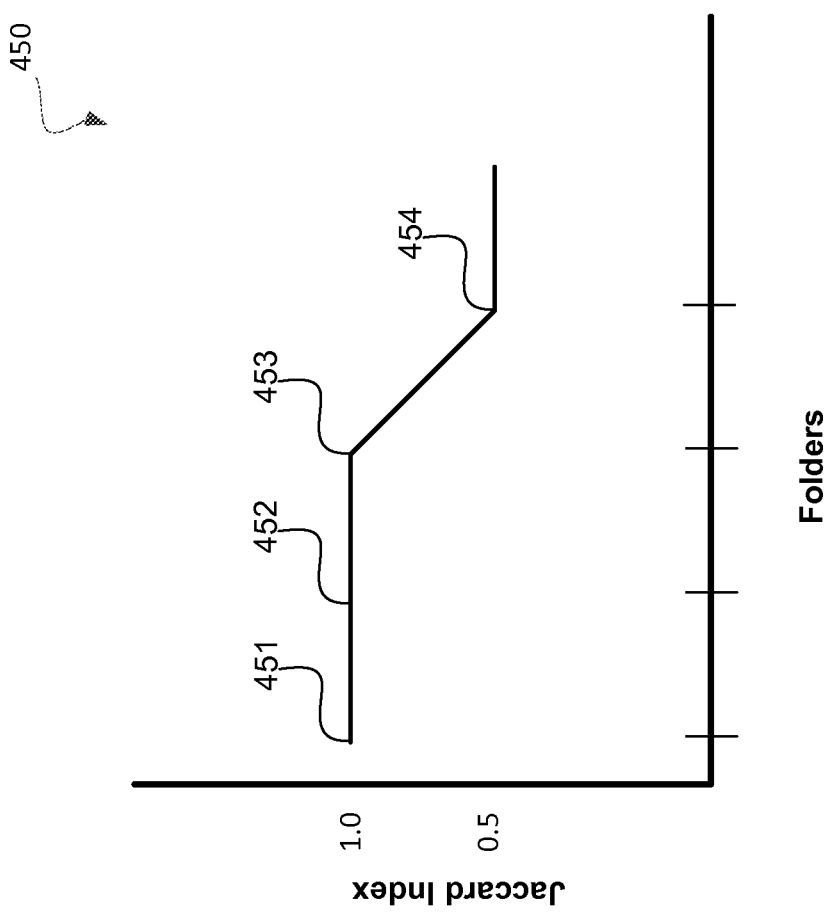

DETERMINING A RECOMMENDED CONTROL POINT FOR A FILE SYSTEM

RELATED APPLICATIONS

This patent application claims the benefit under 35 U.S.C. § 119(e) of U.S. Provisional Application No. 61/858,062 filed Jul. 24, 2013, which is herein incorporated by reference.

TECHNICAL FIELD

The present disclosure relates to file systems, and more particularly, determining a recommended control point for a file system.

BACKGROUND

A network file system may store a large number of files organized throughout many folders or directories in a file system hierarchy. Users of the network file system may navigate the file system hierarchy to access the stored files. A network administrator may be responsible to manage and oversee the network file system. Such responsibilities may include setting access permissions or access control policies for various folders of the network file system. For example, the access permissions or access control policies may specify particular users or particular entities (e.g., business units or organizations that include multiple users) that may access specific folders of the network file system.

BRIEF DESCRIPTION OF THE DRAWINGS

The present disclosure will be understood more fully from the detailed description given below and from the accompanying drawings of various implementations of the disclosure.

FIG. 4B is an illustration of an example curve corresponding to users who have accessed folders in accordance with some embodiments.

SUMMARY

Figure 1:
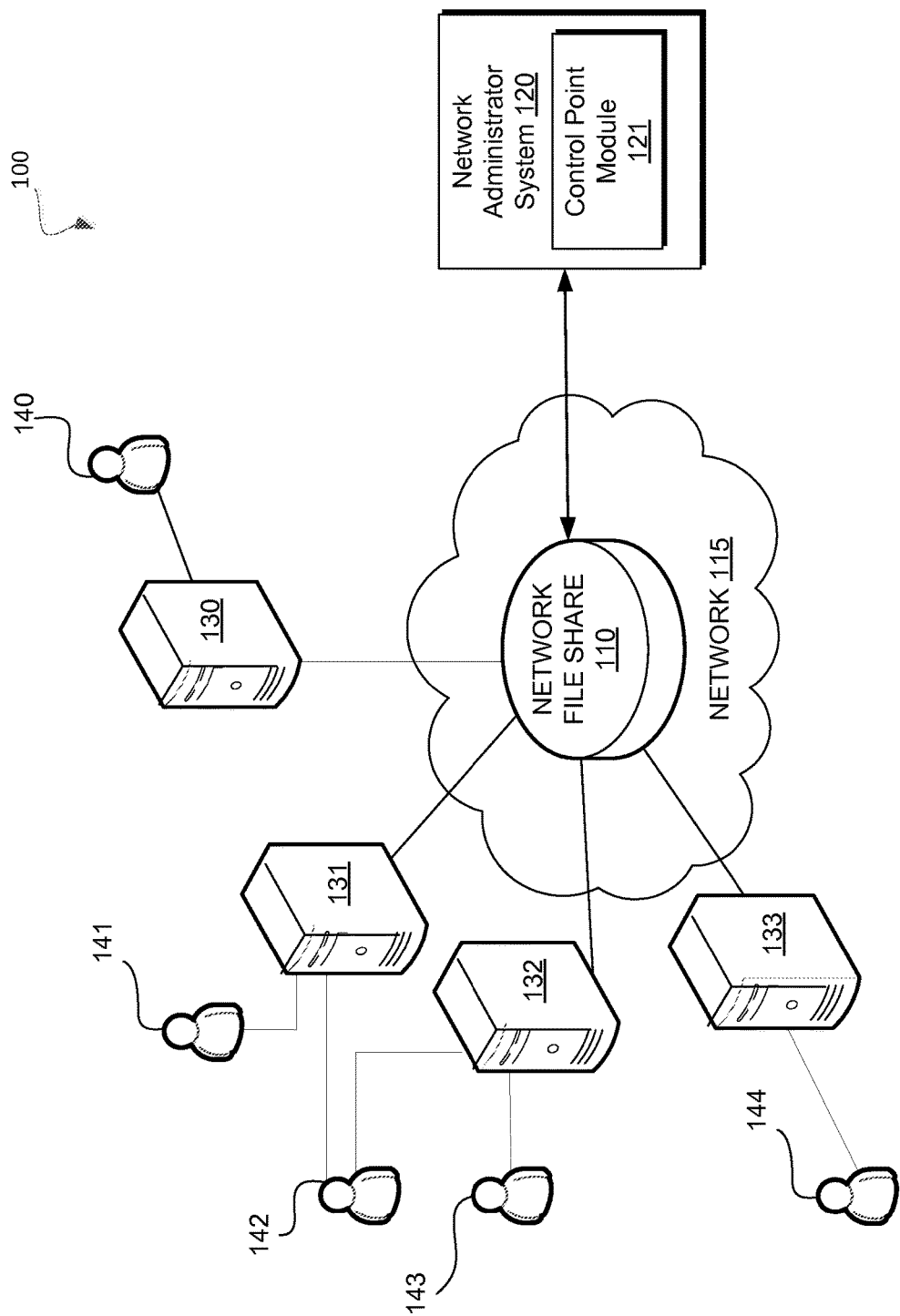
FIG. 1 illustrates an example system architecture in accordance with various implementations.

Information associated with a plurality of users accessing a plurality of files may be received. Each of the files may be stored in a folder of a plurality of folders. Users who have accessed one or more files stored in the corresponding folder may be assigned to each of the folders. Users assigned to each folder of a plurality of pairs of the folders may be compared to identify one or more differences of assigned users between each folder of each pair of the folders. Furthermore, a recommended control point may be determined based on the identified one or more differences of assigned users.

In some embodiments, the control point is a folder associated with a largest difference of the assigned users between each folder of each pair of the folders.

In some embodiments, the recommended control point may be associated with an access control policy that identifies a subset of the users that can access the folder corresponding to the control point.

In some embodiments, the users who have accessed the one or more files stored in the corresponding folder may be assigned to each parent folder of each of the folders. The determining of the recommended control point based on the identified difference of users may further be based on the assigned users of each of the parent folders.

In some embodiments, the determining of the recommended control point based on the identified one or more differences of assigned users comprises identifying a first difference of assigned users between a first folder and a second folder and identifying a second difference of assigned users between a third folder and a fourth folder. The recommended control point may further be based on the first difference when the first difference is larger than the second difference and may further be based on the second difference when the second difference is larger than the first difference.

In some embodiments, the comparing of the users assigned to each folder of the plurality of pairs of the folders to identify one or more differences of the assigned users between each folder of each pair of the folders comprises identifying an originating folder that stores a file that has been accessed by at least one of the users, identifying a parent folder of the originating folder, and identifying one or more ancestral folders of the originating folder. The comparing of the users assigned to each folder of the plurality of pairs of the folders may be based on the originating folder, parent folder, and the one or more ancestral folders.

In some embodiments, the one or more differences of assigned users may be calculated based on a Jaccard index value.

DETAILED DESCRIPTION

Aspects of the present disclosure relate to determining a recommended control point for a file system. A network file system may be a type of file system where multiple users may access files stored in the network file system. The files of the network file system may be stored under various folders or directories and the users may navigate through the various folders or directories to access particular files stored under particular folders in the network file system. For example, in order to access a particular file, a user may select a first folder that includes multiple sub-folders. The user may then select one of the sub-folders that contains the file that the user is seeking to access. The organization of the folders, sub-folders, and files in the network file system may be referred to as a file system hierarchy. Furthermore, folders of a network file system may be a type of storage object that contains or references one or files or one or more other folders (i.e., sub-folders). The navigation of the users through the file system hierarchy of the network file system may be based on control points of the network file system.

A control point of a network file system may specify a folder of the file system hierarchy to which an access control policy may be recommended to be applied. An access control policy may refer to a policy that determines which users (e.g., specific individual users or particular types of users who belong to specific groups or are associated with specific attributes) may access a folder (and files stored under the folder) to which the access control policy has been applied. Thus, the access control policy may specify user access permissions to folders of the network file system. Accordingly, a control point may refer to where (e.g., a specific folder) in a file system an access control policy should be applied to minimize data loss potential in the file system (e.g., to minimize unauthorized users to access particular files stored under various folders).

A control point may be determined based on user activity data of the network file system. For example, the user activity data may identify which users have performed a file operation (e.g., reading the file, writing to the file, creating a file, deleting a file, or performing any other action associated with the file) that is associated with accessing a file and the folder of the network file system that the file is stored or organized under in the network file system. Accordingly, an identification of users who have accessed files for each folder may be identified.

A network administrator, IT administrator, storage administrator, security administrator, or any other professional responsible to manage the network file system may utilize the user activity data to more efficiently manage the network file system by recommending control points to which access control policies may be applied and how to apply the access control policies. For example, recommended control points may be provided to a network administrator based on an analysis of the user activity data of the network file system. Accordingly, the disclosure herein provides an analysis of user activity data associated with folders and files stored on a network file system to provide a recommendation for which folder or folders to apply access control policies for managing the network file system.

Implementations of the present disclosure may include a control point module, which is described in further detail below, to identify the accesses of the files from user activity data and to provide a recommendation for a control point and an access control policy for the control point based on the user activity data. The features of the control point module, which are described in further detail below, may include a user activity data sub-module, a user assigner sub-module, a folder comparison sub-module, a curve generator sub-module, a control point determination sub-module, and a recommendation sub-module.

FIG. 1 illustrates an example system architecture 100 for various implementations. The system architecture 100 may include one or more computing devices 130, 131, 132, and/or 133, one or more network file systems 110, and one or more network administrator systems 120 coupled to each other via a network 115. The network 115 may be a public network, a private network, a wireless network, a cellular network, or a combination thereof.

A network file system 110 may be a type of data or file storage service that provides file storage and file access services to users 140, 141, 142, and/or 143 of computing devices 130, 131, 132, and/or 133. A computing device may be a desktop computer, laptop computer, or a portable computing device such as, but not limited to, mobile telephones, personal digital assistants (PDAs), portable media players, netbooks, tablet computers, portable gaming consoles, portable televisions, electronic book readers, and the like. As shown, one or more users may use the computing devices 130, 131, 132, and/or 133 to remotely access the network file system 110.

The network file system 110 may allow users 140, 141, 142, and/or 143 of the computing devices to access one or more files stored in association with the network file system 110. In some embodiments, the network file system 110 may be a file storage server or network file storage device associated with a large number of stored files that may be remotely accessed by the computing devices. The files stored in the network file system 110 may be organized under a hierarchy of folders (also referred to as directories). A root folder may be considered the first or top-most folder of the file system hierarchy. Files and additional folders (i.e., sub-folders) may be organized under or located in the root folder. Furthermore, additional files and folders may be organized under sub-folders. The users 140, 141, 142, and/or 143 of the computing devices may access files at various folders through different levels of the file system hierarchy of the network file system 110.

The network file system 110 may be associated with and/or store files of a corporate enterprise. Employees of the corporate enterprise may be users of the network file system 110. For example, employees in an engineering department may access engineering related files under engineering folders and employees in a marketing department may access marketing related files under marketing folders. The system architecture 100 may include one or more network administrator systems 120 to provide a control point module 121 to provide information to assist in the administration of the file system hierarchy of the network file system 110 by analyzing user activity data to provide a recommendation for a control point in the file system hierarchy of the network file system 110. For example, a control point for the network file system 110 may be recommended based on differences of users associated with a first folder and a second folder that is a sub-folder of the first folder (i.e., the first folder is a parent folder and the second folder is a child folder). Such an analysis may provide for a control point for users associated with the engineering department and another control point for users associated with the marketing department.

As such, the control point module 121 may receive a log file that includes information identifying each instance of a file being accessed on the network file system as well as the user accessing the file. The control point module 121 may identify a folder that each of the accessed files is stored under in the file system hierarchy. In some embodiments, the control point module 121 may recommend a control point based on users or types of users who have accessed the files under the folders, as is discussed in further detail below.

Figure 2:
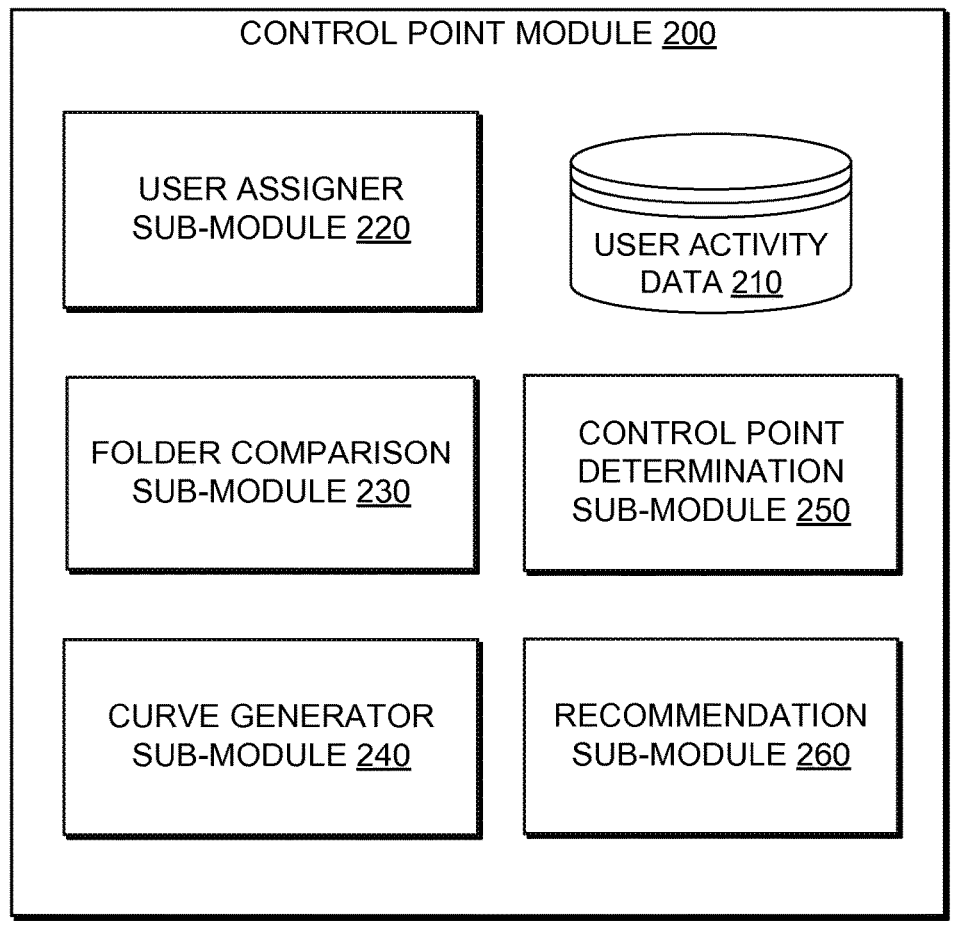
FIG. 2 is a block diagram of an example of a control point module in accordance with some embodiments.

FIG. 2 is a block diagram of a control point module 200 in accordance with some embodiments. In general, the control point module 200 may correspond to the control point module 121 in a network administrator system 120 as shown in FIG. 1. The control point module 200 may include a user activity data sub-module 210, user assigner sub-module 220, folder comparison sub-module 230, curve generator sub-module 240, control point determination sub-module 250, and a recommendation sub-module 260. In alternative embodiments, the functionality of one or more of the sub-modules may be combined or divided.

As shown in FIG. 2, the control point module 200 may include a user activity data sub-module 210. In some embodiments, the user activity data sub-module 210 may record or store information associated with users accessing files stored in the network file system. For example, the user activity data sub-module 210 may store each instance of a user accessing a file and a folder that stores the file (i.e., the containing folder). The user activity data sub-module 210 may further store attributes associated with the user. Examples of attributes of a user include, but are not limited to, a business unit or organization (e.g., engineering, finance, legal, etc.) that the user is assigned to, a location associated with the user, job title of the user, and so forth. The user activity data sub-module 210 may be a persistent storage unit. In some embodiments, a persistent storage unit may be a local storage unit or a remote storage unit. Persistent storage units may be a magnetic storage unit, optical storage unit, solid state storage unit, electronic storage units (main memory), or similar storage unit. Persistent storage units may be a monolithic device or a distributed set of devices. A 'set', as used herein, refers to any positive whole number of items.

The user assigner sub-module 220 may assign users to folders. For example, users who have accessed a file that is stored under a folder may be assigned to or associated with the folder. Additionally, in some embodiments, users who are assigned to a folder may further be assigned to a parent folder and to other folders. For example, a file may be accessed by a first user and the file may be stored under a first folder. The user assigner sub-module 220 may subsequently identify if the first folder is located within a second folder (e.g., the first folder is a sub-folder or child folder of another folder). Such a relationship between the first folder and the second folder may be a parent-child relationship (e.g., the first folder is a child folder and the second folder is a parent folder). A child folder may also be referred to as an immediate child folder with respect to a parent folder if the child folder is directly stored under the parent folder. For example, the parent folder may be at a first level of a file system hierarchy and the immediate child folder may be at a second level of the file system hierarchy that is immediately under the first level of the file system hierarchy. In some embodiments, after identifying that the first folder is located within the second folder, the user assigner sub-module 220 may assign the users who have accessed the file under the first folder to the second folder. For example, the first user may be assigned to the second folder. Additionally, if the second folder contains additional folders, users associated with the additional folders may also be assigned to the second folder. Furthermore, the user assigner sub-module 220 may identify if the second folder is located within a third folder. Such a third folder may be referred to as an ancestral folder with respect to the first folder (and a parent folder of the second folder). If the user assigner sub-module 220 does identify the third folder, then the user assigner sub-module 220 may continue to identify additional ancestral folders until the root folder of the network file system is identified as an ancestral folder. In some embodiments, the identification of a parent and any ancestral folder associated with a folder containing an accessed file may be performed for each folder that contains an accessed file. Further details with regard to a file system hierarchy and folders are disclosed with relation to FIG. 4A.

Referring to FIG. 2, the folder comparison sub-module 230 may compare users that have been assigned to folders. For example, the folder comparison sub-module 230 may compare users assigned to a first folder with users assigned to a parent folder of the first folder (i.e., a second folder). In some embodiments, the comparison of the users may involve the identifying of differences between users who are assigned to the first folder and the users who are assigned to the second folder. The folder comparison sub-module 230 may continue to compare users assigned to pairs of folders in the file system hierarchy until the root folder of the file system has been reached. For example, a first folder may be stored under a second folder that is stored under the root folder. The folder comparison sub-module 230 may identify differences between users assigned to the first folder and users assigned to the second folder as well as differences between users assigned to the second folder and users assigned to the root folder.

The curve generator sub-module 240 may create a mathematical calculation or curve based on the users assigned to folders. For example, the curve generator sub-module 240 may create a representation of the users assigned to the folders in a particular path of a file system hierarchy (e.g., a path from a folder at a lower level of the file system hierarchy to the root folder). Further details of such a representation are disclosed with relation to FIGS. 4B and 6.

The control point determination module 250 may identify a recommended control point based on the curve that is based on the users assigned to folders. For example, the control point determination module 250 may identify a recommended control point based on differences of users assigned to each folder in a pair of folders. In some embodiments, the recommended control point may be determined based on the largest difference of assigned users between a pair of folders (e.g., the largest difference between a parent folder and an immediate child folder). Further details with regard to determining a recommended control point are disclosed with relation to FIGS. 4A-6. Furthermore, the recommendation sub-module 260 may display a recommendation of the control point determined by the control point determination module 250. For example, the recommendation sub-module 260 may display a recommendation of a particular folder to which an access control policy should be applied. Such a folder may be referred to as the recommended control point. Additionally, the recommendation sub-module 260 may identify users who should be included in the access control policy. For example, users who should be given access permissions to the folder that has been determined to be a recommended control point may be identified. In some embodiments, a network administrator may subsequently accept or confirm the application of the access control policy to the folder that has been identified as a recommended control point.

Figure 3:
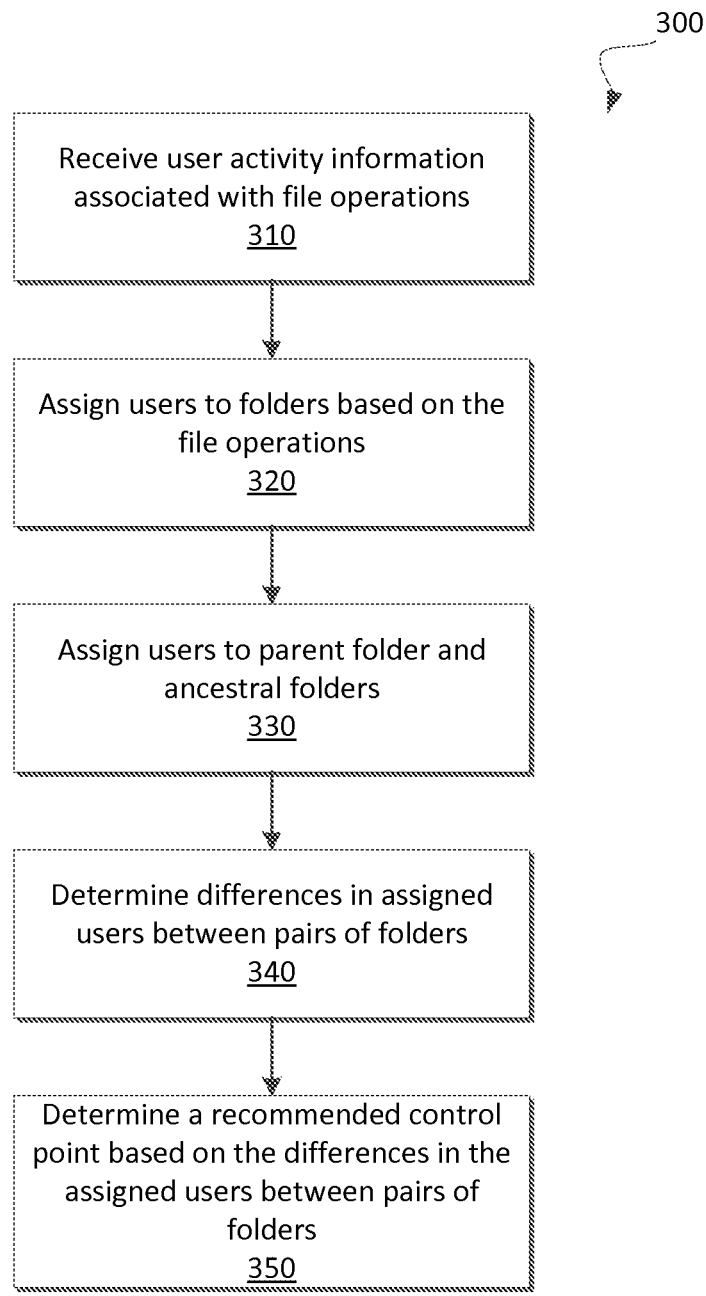
FIG. 3 is a flow diagram illustrating an example method to determine a recommended control point in accordance with some embodiments of the present disclosure.

FIG. 3 is a flow diagram illustrating an example method 300 to determine a recommended control point. The method 300 may be performed by processing logic that may comprise hardware (e.g., a processing device, circuitry, dedicated logic, programmable logic, microcode, etc.), software (e.g., instructions run on a processing device), or a combination thereof. In some embodiments, the method 300 may be performed by a control point module 121 or 200 in a network administrator system 120 of FIG. 1.

As shown in FIG. 3, the method 300 may begin by the processing logic receiving user activity data or information associated with file operations (block 310). For example, the processing logic may receive data (e.g., a file log) that identifies each instance of a file being accessed in a network file system. In some embodiments, user activity information may further include information that identifies a folder that contains the accessed file. Thus, the user activity information may identify specific users that have accessed a particular file that is stored under a particular folder. The processing logic may further assign users to folders based on the file operations (block 320). Users may be assigned to a folder based on the users accessing a file that is stored under the folder. As an example, a first user may access a first file stored under a first folder and a second file stored under a second folder. A second user may further access the first file (or another file) stored under the first folder. Accordingly, the first folder may be assigned or associated with the first user and the second user as each of the first user and the second user have accessed a file that is stored under the first folder. Furthermore, the second folder may be assigned or associated with the first user as the first user has accessed a file that is stored under the second folder. In some embodiments, particular users may be excluded or prevented from being assigned to any folder. For example, a user that is identified as an administrator of the network file system (e.g., with a job title user attribute that specifies that the user is an administrator) may not be assigned to any folder even though the user may be identified as having accessed a file stored under a particular folder. The processing logic may further assign or associate users to parent folders and ancestral folders (block 330). For example, users may be assigned to a parent folder by also assigning the users that are assigned to immediate child folders to the parent folder. In some embodiments, users assigned or associated with a first folder may be assigned to or associated with a parent folder of the first folder as well as ancestral folders of the first folder. For example, a first folder may be stored or organized under a second folder (e.g., the first folder is a child folder and the second folder is a parent folder) and the second folder may be stored under a third folder (e.g., the third folder is an ancestral folder to the first folder and a parent folder to the second folder). In some embodiments, the users assigned to the first folder may also be assigned to or associated with the second folder as well as the third folder. Furthermore, users assigned to or associated with the second folder may be assigned to or associated with the third folder. Thus, users assigned to or associated with a folder that is lower in the file system hierarchy may be propagated to folders that are higher in the file system hierarchy. In some embodiments, such propagation may be performed on folders within a path to the root folder.

As an example, a first folder may be a child folder to a second folder and the second folder may be a child folder to a third folder. A user Alfred may be identified as having accessed a file stored under the first folder, a user Bob may be identified as having accessed a file stored under the second folder, and users Charlie and Dorothy may be identified as having accessed files stored under the third folder. Thus, the first folder may be associated with or assigned the user Alfred, the second folder may be associated with or assigned the users Alfred and Bob, and the third folder may be associated with or assigned the users Alfred, Bob, Charlie, and Dorothy.

In some embodiments, user attributes may be assigned to or associated with the folders. For example, each user may be associated with user attributes such as business unit (e.g., engineering, legal, finance, etc.), an office location, job title, etc. In the same or alternative embodiments, user attributes may be propagated to parent folders and ancestral folders instead of identification of specific users being propagated to such folders. For example, a user with a first attribute at a first value (e.g., a user Bob with a business unit attribute of 'engineering') may access a first file stored under a first folder and a second user with the first attribute at a second value (e.g., a user Charlie with a business unit attribute of 'legal') may access a second file stored under a second folder that is a parent folder to the first folder. Accordingly, the first folder may be assigned a user attribute of Engineering and the second folder may be assigned a user attribute of Engineering and Legal. The assigning of user attributes to folders and determining a recommended control point may be based on user attributes or users. Accordingly, although portions of the disclosure relate to identifying users, such portions may also relate to identifying user attributes and using the user attributes to recommend a control point based on differences of assigned user attributes between a first folder (e.g., a parent folder) and a second folder (e.g., an immediate child folder of the parent folder).

Referring to FIG. 3, the method 300 may determine differences in assigned users between pairs of folders (block 340). For example, differences between users (or user attributes) that are assigned to or associated with folders may be identified. In some embodiments, the differences between users or user attributes may be identified between a child folder and a parent folder. In the same or alternative embodiments, the differences between users or user attributes may be identified between each pair of child folders and parent folders. For example, the difference between the assigned users or user attributes of one parent folder and one child folder may be identified. Further details with regard to identifying differences between users or user attributes assigned to or associated with folders are disclosed with relation to FIGS. 4A-4B.

The method 300 may further determine a recommended control point based on the differences in the assigned users between pairs of folders (block 350). For example, a recommended control point may be determined when the users assigned to a folder significantly differ from users associated to the folder's corresponding parent folder. Alternatively, a recommended control point may be determined when the users assigned to an ancestral folder or parent folder significantly differs from the users assigned to a child folder. In some embodiments, a recommended control point may identify a particular folder for which an access control policy should be applied. The access control policy may identify users (or users associated with certain user attributes) that should be able to access the folder or files stored under the folder. Further details with regard to determining a recommended control point are disclosed with relation to FIGS. 4A-6.

Figure 4A:
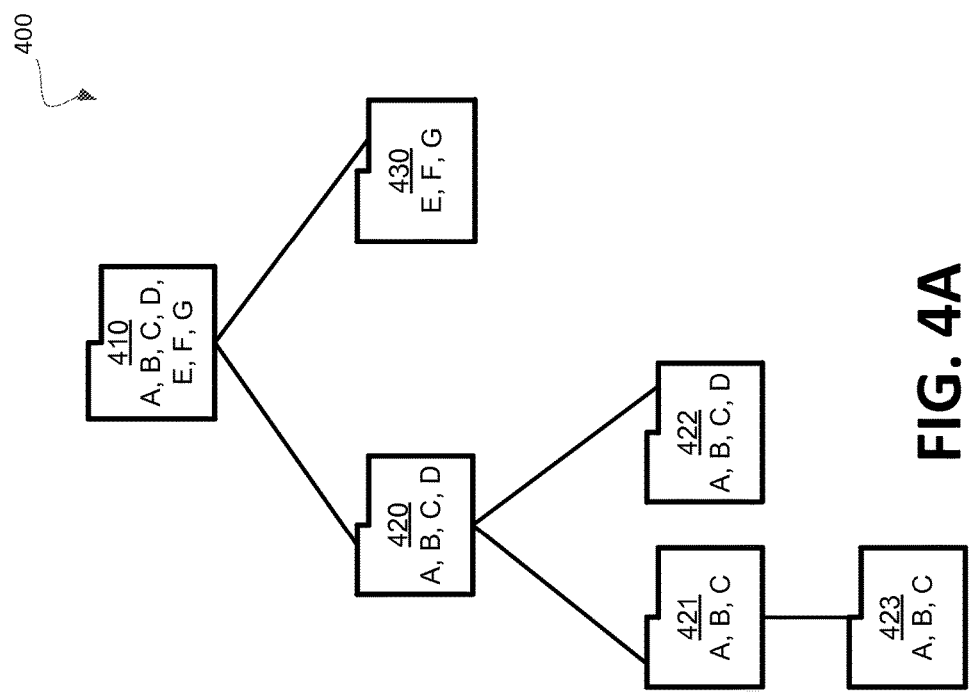
FIG. 4A is an illustration of an example file system hierarchy in accordance with some embodiments.

FIG. 4A is an illustration of an example file system hierarchy 400 in accordance with some embodiments. In general, the file system hierarchy 400 may represent an organization of folders storing files in a network file system (e.g., network file system 110). The file system hierarchy 400 may be identified by the network administration system 120 and/or the control point module 121 or 200 of FIGS. 1 and 2.

As shown in FIG. 4A, the file system hierarchy 400 may include a hierarchy of folders arranged in multiple levels. For example, at a first level, the file system hierarchy 400 may include a folder 410 that is referred to as a root folder. In some embodiments, the root folder is the first folder in the file system hierarchy and thus does not have a parent folder. For example, the root folder may correspond to the entire network file system of a corporate enterprise with various separate file servers, file shares, folders, and files of a corporate enterprise organized under the root folder. The file system hierarchy 400 may include a second level of folders 420 and 430. In some embodiments, the root folder 410 may be considered a parent folder to the folders 420 and 430 as the folders 420 and 430 are located within or stored under the root folder 410. Furthermore, the file system hierarchy 400 may include a third level of folders 421 and 422. The folders 421 and 422 may be located within the folder 420. In such an example, the folder 420 may be considered a parent folder to the folders 421 and 422. Furthermore, the folder 410 may be considered an ancestral folder to each of the folders 421 and 422 as it is a parent folder to the folder 420. Additionally, the file system hierarchy 400 may include a fourth level that includes the folder 423. The folder 421 may be considered a parent folder to the folder 423 and the folders 410 and 420 may be considered ancestral folders to the folder 423.

As previously described, users (or user attributes) may be assigned to or associated with folders. Furthermore, users assigned to or associated with a child folder may also be assigned to or associated with parent folders and ancestral folders. As an example, the folder 423 may be associated with users (or user attributes) A, B, and C. Furthermore, the folder 421 may also be associated or assigned the users A, B, and C while the folder 422 is assigned the users A, B, C, and D. For example, the users A, B, and C may have accessed a file stored under the folders 421 and 423. Additionally, the folder 422 may be associated with or assigned the user D in addition to users A, B, and C. The folder 420 may be associated with or assigned the users that are assigned or associated with any folder under the folder 420. For example, the folder 420 may be assigned the users A, B, C, and D (e.g., the parent folder 420 is assigned the users of its child folders 421 and 422). The folder 430 may be associated with or assigned the users E, F, and G. For example, the users E, F, and G may have accessed a file stored under the folder 430. Furthermore, the root folder 410 may be assigned or associated with users of any folder that is under the root folder 410. Thus, the root folder 410 may be assigned the users A, B, C, and D from the folder 420 as well as the users E, F, and G from the folder 430. In some embodiments, the root folder 410 may be assigned any user who has accessed any file that is stored in the network file system.

Thus, the file system hierarchy may be associated with several differences in users or user attributes that are associated with pairs of folders. For example, the folder 423 is assigned the same users as the folder 421. Accordingly, no difference between users is identified between the folder 421 and the folder 423. However, the folder 420 is assigned the users A, B, C, and D. Thus, a difference of one user (e.g., the user D) out of four users may be identified between the folder 420 and the folder 421. Furthermore, a second difference may be identified between the folder 410 and the folder 420. Since the folder 410 is assigned users A, B, C, D, E, F, and G and the folder 420 is assigned the users A, B, C, and D, the second difference may be of three users out of seven users. In some embodiments, the largest difference of users between pairs of folders may be used to determine a recommended control point. Further details with regard to identifying the largest difference between users assigned to pairs of folders are disclosed with relation to FIGS. 5-6.

FIG. 4B is an illustration of an example curve 450 corresponding to users who have accessed folders. In general, the curve 450 may represent differences between users assigned to folders in a network file system (e.g., network file system 110). The curve 450 may be identified or generated by the network administration system 120 and/or the control point module 121 or 200 of FIGS. 1 and 2.

As shown in FIG. 4B, the curve 450 may represent differences in users or user attributes assigned to folders in a network file system. In some embodiments, the curve 450 may represent a path from a folder that stores a file that has been accessed by a user. Such a folder may be referred to as an originating folder. The users assigned to the originating folder may be compared with the users assigned to the parent folder and each ancestral folder by computing a Jaccard index based on the users assigned to each of the folders. In some embodiments, the Jaccard index may be a statistic that is used to compare the similarity and diversity between sample sets (e.g., users assigned to folders). The Jaccard index may measure the similarity or difference between sample sets and may be defined by the size of the intersection divided by the size of the union of the sample sets. For example, the sample sets may correspond to users assigned to folders. Thus, the Jaccard index may be calculated by dividing the number of users that are each assigned to both a first folder and a second folder divided by the total number of different users that are assigned to either of the first folder and the second folder. The curve 450 may represent a plot of the Jaccard indices that have been computed for the folders in a path of the network file system. For example, the curve 450 may represent Jaccard indices for a first folder at point 451, a second folder at point 452, a third folder at point 453, and a fourth folder at point 454. For example, the folder at point 454 may be considered a root folder, the third folder at point 453 may be at a next level of the file system hierarchy, the second folder at point 452 may be stored under the folder at point 453, and the first folder at point 451 may be an originating folder that is stored under the folder at the point 452.

Referring to FIG. 4B, the folders at points 451, 452, and 453 may be associated with a Jaccard index of 1.0. For example, the users or user attributes assigned to each of the folders 451, 452, and 453 may be identical (e.g., there is no difference between users assigned to the folders). However, the folder at point 454 may be associated with a Jaccard index value of 0.5. Such a value may indicate that the users assigned to the folder at point 454 differ from the users assigned to the folder at point 453 by 50%. For example, in such a case, the folder at point 453 may be assigned users or user attributes A, B, and C while the folder at point 454 may be assigned users or user attributes A, B, C, D, E, and F. Thus, the intersection of the users assigned to both folders may be three users (e.g., A, B, C) and the union of the users assigned to both folders may be six users (e.g., A, B, C, D, E, and F), thus resulting in a Jaccard index value of 0.5 for the folder at point 454. Thus, the change in the Jaccard index value for the folder at point 453 from the folder at point 454 may indicate a difference in users assigned to each respective folder. For example, an angle (also referred to as a 'knee') in the curve 450 may identify a difference in users that are assigned to folders in a pair of folders.

Figure 5:
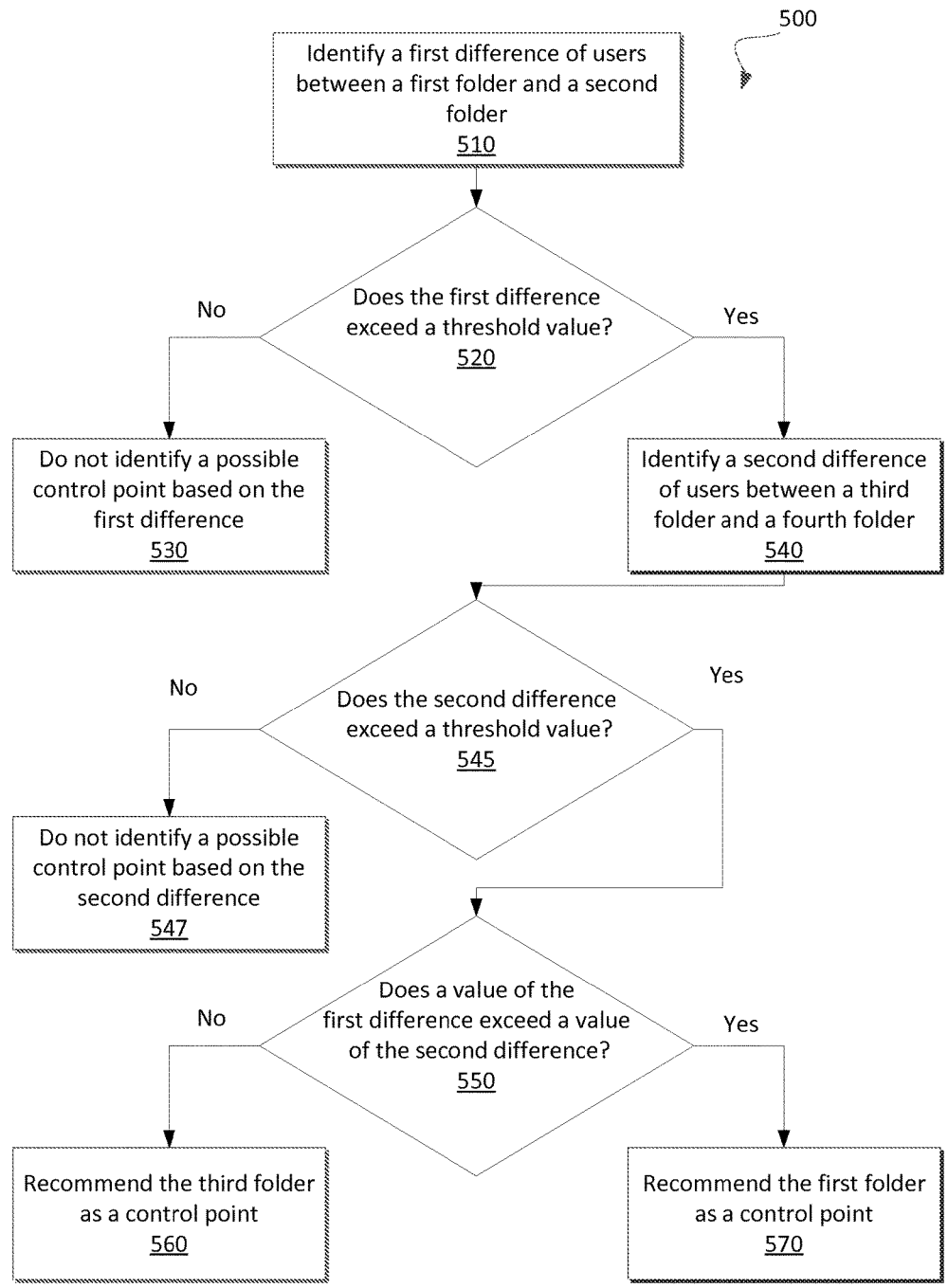
FIG. 5 is an example method to determine a recommended control point from multiple control points in accordance with some embodiments of the present disclosure.

FIG. 5 is an example method 500 to determine a recommended control point from multiple control points. The method 500 may be performed by processing logic that may comprise hardware (e.g., a processing device, circuitry, dedicated logic, programmable logic, microcode, etc.), software (e.g., instructions run on a processing device), or a combination thereof. In some embodiments, a control point module 121 or 200 may perform the method 500 in a network administrator system 120 of FIG. 1.

As shown in FIG. 5, the method 500 may begin by the processing logic identifying a first difference of users between a first folder and a second folder. For example, the first folder may be an originating folder (e.g., a folder that includes a file that has been accessed by a user). The second folder may be a parent folder of the first folder. The processing logic may identify a difference between users who have been assigned to the first folder and users assigned to the second folder. Such a difference may correspond to a drop in a Jaccard index value between the first folder and the second folder. The processing logic may further determine if the first difference exceeds a threshold value (block 520). For example, in some embodiments, the first difference may correspond to an angle or line of a curve representing Jaccard indices (e.g., the angle or line between the point 453 and the point 454 of the curve 450). In the same or alternative embodiments, the angle may be calculated by the following equation:

$$\text{Angle} = (2 * \text{jaccard\_values}[i]) - (\text{jaccard\_values}[i-1] + \text{jaccard\_values}[i+1]).$$

In some embodiments, the jaccard_values may correspond to the Jaccard index values of a curve and the variable i may refer to a particular point of the curve (e.g., points 451, 452, 453, and/or 454). If the calculated angle that represents the difference does not exceed a threshold value (e.g., a value of 0.0), then the first difference may not be identified as a possible recommended control point (block 530). However, if the calculated angle that represents the difference does exceed the threshold value, then the first difference may be identified as a possible recommended control point and a second difference of users between a third folder and a fourth folder may be identified (block 540). The processing logic may further determine if the second difference exceeds the threshold value (block 545). If the second difference does not exceed the threshold logic, then a possible control point may not be identified based on the second difference (block 547). However, if the processing logic does determine that the second difference also exceeds the threshold value, then the processing logic may further determine if a value associated with the first difference (e.g., a first angle value) exceeds a value of the second difference (e.g., a second angle value) (block 550). If the value of the first difference does not exceed a value of the second difference, then the third folder may be recommended as a control point (block 560). However, if the value of the first difference does exceed a value of the second difference, then the first folder may be recommended as a control point (block 570).

Thus, a curve that represents a path from an originating folder to a root folder of a network file system may be associated with multiple differences of users assigned to pairs of folders that may be represented by an angle of the curve. Accordingly, the curve may include a first difference or angle and a second difference or angle. In some embodiments, the difference or angle that is larger may be identified as the difference or angle to use to determine a recommended control point. For example, a folder associated with the largest difference or angle of a curve may be selected as a recommended control point.

Figure 6:
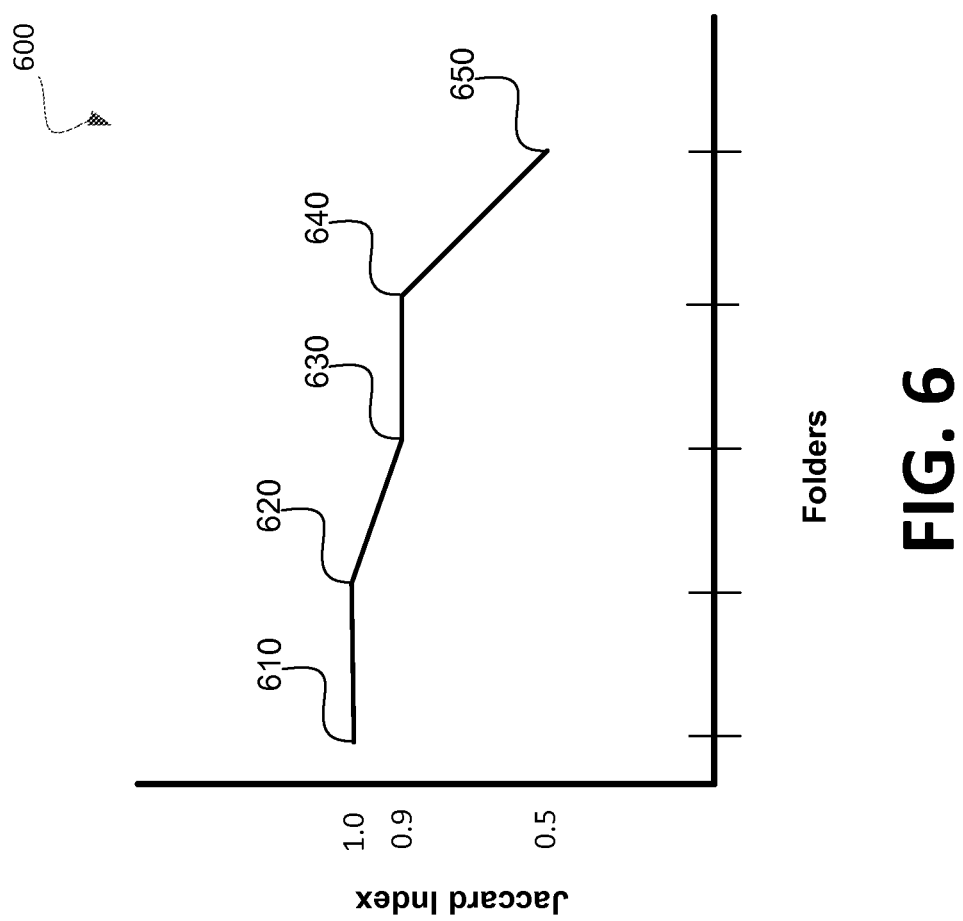
FIG. 6 is an illustration of an example curve including multiple possible control points in accordance with some embodiments.

FIG. 6 is an illustration of an example curve 600 including multiple possible control points. In general, the curve 600 may represent differences between users assigned to folders in a network file system (e.g., network file system 110). The curve 600 may be identified or generated by the network administration system 120 and/or the control point module 121 or 200 of FIGS. 1 and 2.

As shown in FIG. 6, the curve 600 may identify Jaccard index values for folders at points 610, 620, 630, 640, and 650. The curve 600 may include multiple angles that represent differences between users assigned to folders of pairs of folders. For example, a first angle representing a first difference between users of folders may be identified between the point 620 (e.g., associated with the Jaccard index value of 1.0) and the point 630 (e.g., associated with the Jaccard index value of 0.9). The curve 600 may include a second angle that represents a second difference between users assigned to folders of a pair of folders. For example, a second angle may represent a second difference between users assigned to a folder at the point 640 and the folder at the point 650. As shown, the second angle may be larger than the first angle. Thus, in some embodiments, a control point may be recommended based on the second angle. For example, the folder at the point 640 may be recommended as a control point.

Figure 7:
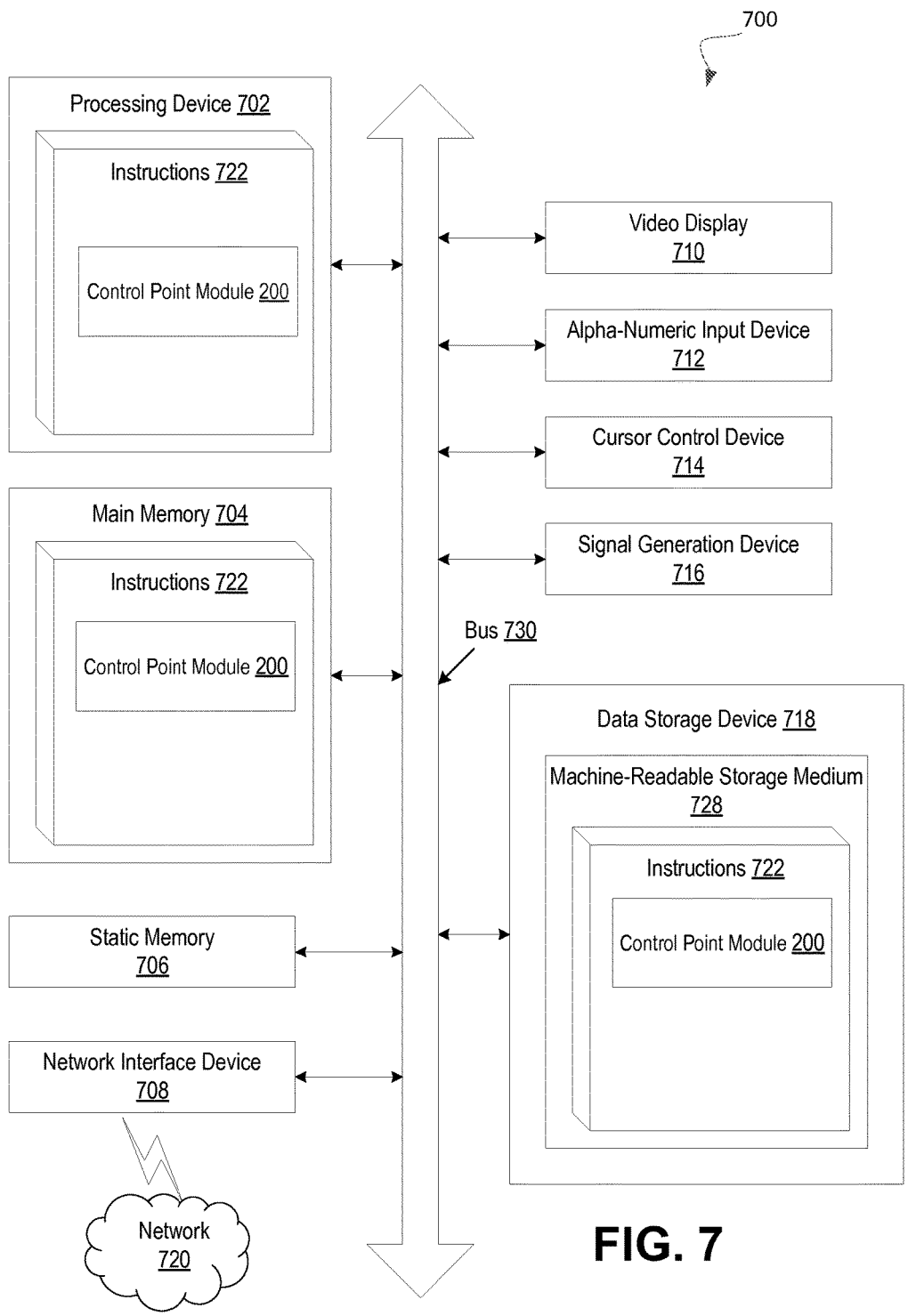
FIG. 7 is a block diagram of an example computer system that may perform one or more of the operations described herein.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 702 is configured to execute instructions 722 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium 728 (also known as a computer-readable medium) on which is stored one or more sets of instructions or software 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting machine-readable storage media.

In one implementation, the instructions 722 include instructions for a control point module (e.g., control point module 121 of FIG. 1 and/or control point module 200 of FIG. 2) and/or a software library containing methods that call modules or sub-modules in a control point module. While the machine-readable storage medium 728 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving information associated with a plurality of users accessing a plurality of computer files, wherein each of the computer files is stored in a folder of a plurality of folders on a storage device;
assigning, to each of the folders, users who have accessed one or more computer files stored in the corresponding folder;
comparing users assigned to each folder of a plurality of pairs of the folders, wherein said comparing comprises:
identifying at least one of users and user attributes assigned to a first folder;
identifying at least one of users and user attributes assigned to a second folder;
determining a first difference between the identified at least one of users and user attributes assigned to the first folder and the second folder; and
determining a second difference between the identified at least one of users and user attributes assigned to a third folder and a fourth folder;
determining, by a processing device, a recommended control point based on a comparison of the first difference to the second difference, wherein the recommended control point comprises a folder of the plurality of pairs of the folders, wherein the recommended control point is based on the first difference when the first difference is larger than the second difference and is based on the second difference when the second difference is larger than the first difference.

2. The method of claim 1, wherein a user is assigned to a given folder in response to the user accessing the given folder.

3. The method of claim 2, wherein the recommended control point is associated with an access control policy that identifies a subset of the users that can access the folder corresponding to the control point.

4. The method of claim 1, further comprising:
assigning, to each parent folder of each of the folders, the users who have accessed the one or more computer files stored in the corresponding folder, wherein the determining of the recommended control point is further based on the assigned users of each of the parent folders.

5. The method of claim 1, wherein the comparing of the users assigned to each folder of the plurality of pairs of the folders to identify one or more differences of the assigned users between each folder of each pair of the folders comprises:
identifying an originating folder that stores a computer file that has been accessed by at least one of the users;
identifying a parent folder of the originating folder; and
identifying one or more ancestral folders of the originating folder,
wherein the comparing of the users assigned to each folder of the plurality of pairs of the folders is based on the originating folder, parent folder, and the one or more ancestral folders.

6. The method of claim 1, wherein the one or more differences of assigned users is calculated based on a Jaccard index value.

7. A system comprising:
a memory; and
a processing device coupled with the memory and to:
receive information associated with a plurality of users accessing a plurality of computer files, wherein each of the computer files is stored in a folder of a plurality of folders on a storage device;
assign, to each of the folders, users who have accessed one or more computer files stored in the corresponding folder;
compare users assigned to each folder of a plurality of pairs of the folders, wherein to perform said compare the processing device is configured to:
identify at least one of users and user attributes assigned to a first folder;
identify at least one of users and user attributes assigned to a second folder;
determine a first difference between the identified at least one of users and user attributes assigned to the first folder and the second folder;
determine a second difference between the identified at least one of users and user attributes assigned to a third folder and a fourth folder;
determine a recommended control point based on a comparison of the first difference to the second difference, wherein the recommended control point comprises a folder of the plurality of pairs of the folders, wherein the recommended control point is based on the first difference when the first difference is larger than the second difference and is based on the second difference when the second difference is larger than the first difference.

8. The system of claim 7, wherein a user is assigned to a given folder in response to the user accessing the given folder.

9. The system of claim 8, wherein the recommended control point is associated with an access control policy that identifies a subset of the users that can access the folder corresponding to the control point.

10. The system of claim 7, wherein the processing device is further to:
assign, to each parent folder of each of the folders, the users who have accessed the one or more computer files stored in the corresponding folder, wherein the determining of the recommended control point is further based on the assigned users of each of the parent folders.

11. The system of claim 7, wherein the comparing of the users assigned to each folder of the plurality of pairs of the folders to identify one or more differences of the assigned users between each folder of each pair of the folders comprises:
identifying an originating folder that stores a computer file that has been accessed by at least one of the users;
identifying a parent folder of the originating folder; and
identifying one or more ancestral folders of the originating folder,
wherein the comparing of the users assigned to each folder of the plurality of pairs of the folders is based on the originating folder, parent folder, and the one or more ancestral folders.

12. The system of claim 7, wherein the one or more differences of assigned users is calculated based on a Jaccard index value.

13. A non-transitory computer readable storage medium including instructions that, when executed by a processing device, cause the processing device to perform operations comprising:
receiving information associated with a plurality of users accessing a plurality of computer files, wherein each of the computer files is stored in a folder of a plurality of folders on a storage device;
assigning, to each of the folders, users who have accessed one or more computer files stored in the corresponding folder;
comparing users assigned to each folder of a plurality of pairs of the folders, wherein said comparing comprises:
identifying at least one of users and user attributes assigned to a first folder;
identifying at least one of users and user attributes assigned to a second folder;
determining a first difference between the identified at least one of users and user attributes assigned to the first folder and the second folder; and
determining a second difference between the identified at least one of users and user attributes assigned to a third folder and a fourth folder;
determining, by a processing device, a recommended control point based on a comparison of the first difference to the second difference, wherein the recommended control point comprises a folder of the plurality of pairs of the folders, wherein the recommended control point is further based on the first difference when the first difference is larger than the second difference and is based on the second difference when the second difference is larger than the first difference.

14. The non-transitory computer readable storage medium of claim 13, wherein a user is assigned to a given folder in response to the user accessing the given folder.

15. The non-transitory computer readable storage medium of claim 14, wherein the recommended control point is associated with an access control policy that identifies a subset of the users that can access the folder corresponding to the control point.

16. The non-transitory computer readable storage medium of claim 13, the operations further comprising:
assigning, to each parent folder of each of the folders, the users who have accessed the one or more computer files stored in the corresponding folder, wherein the determining of the recommended control point is further based on the assigned users of each of the parent folders.

17. The non-transitory computer readable storage medium of claim 13, wherein the comparing of the users assigned to each folder of the plurality of pairs of the folders to identify one or more differences of the assigned users between each folder of each pair of the folders comprises:

identifying an originating folder that stores a computer file that has been accessed by at least one of the users;

identifying a parent folder of the originating folder; and identifying one or more ancestral folders of the originating folder, wherein the comparing of the users assigned to each folder of the plurality of pairs of the folders is based on the originating folder, parent folder, and the one or more ancestral folders.

* * * * *